United States Patent [19]

Hanada et al.

[11] 4,350,269

[45] Sep. 21, 1982

[54] TONER DISPENSING DEVICE

[75] Inventors: Yoshihiro Hanada; Takafumi Tottori, both of Toyokawa, Japan

[73] Assignee: Minolta Camera Kabushiki Kaisha, Osaka, Japan

[21] Appl. No.: 141,612

[22] Filed: Apr. 15, 1980

[30] Foreign Application Priority Data

Apr. 26, 1979 [JP] Japan .............................. 54-56818[U]

[51] Int. Cl.³ ............................................. G01F 11/24
[52] U.S. Cl. .................................... 222/227; 222/272; 222/410; 222/DIG. 1
[58] Field of Search ................. 222/DIG. 1, 226, 227, 222/236, 238, 412, 56, 410, 414, 271, 272; 198/534

[56] References Cited

U.S. PATENT DOCUMENTS

| 2,687,244 | 8/1954 | Peterson | 222/272 |
| 3,854,627 | 12/1974 | Coons | 222/410 |
| 3,951,309 | 4/1979 | Kadowaki | 222/DIG. 1 |
| 3,954,331 | 5/1976 | Smith | 222/DIG. 1 |
| 4,089,600 | 5/1978 | Ito et al. | |
| 4,113,371 | 9/1978 | Fraser et al. | 222/DIG. 1 |
| 4,122,981 | 10/1978 | Takeuchi et al. | |
| 4,133,459 | 1/1979 | Forward | 222/DIG. 1 |

FOREIGN PATENT DOCUMENTS 52-77356  6/1977  Japan ................................. 222/236

Primary Examiner—H. Grant Skaggs
Attorney, Agent, or Firm—Wenderoth, Lind & Ponack

[57] ABSTRACT

A toner dispensing device has a toner storage chamber provided in its lower portion with an opening for passing toner therethrough, a roller disposed within the storage chamber close to the opening and rotatable to deliver the toner from the storage chamber outward through the opening, an intermediate toner supply chamber in communication with the storage chamber through the opening and for receiving toner to keep it substantially full, and a feeder provided within the intermediate supply chamber for feeding the toner out of the intermediate supply chamber at a constant rate.

10 Claims, 3 Drawing Figures

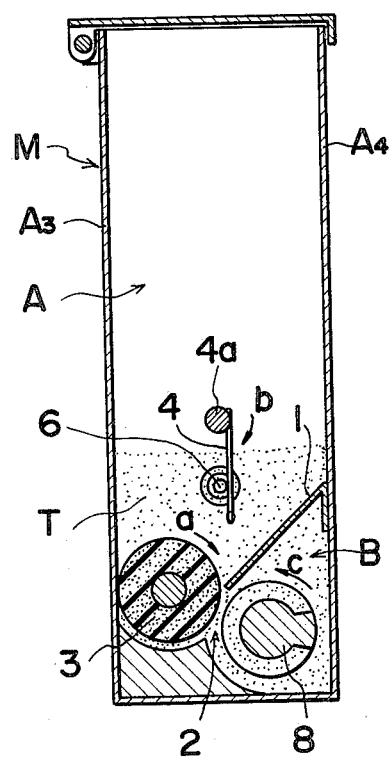
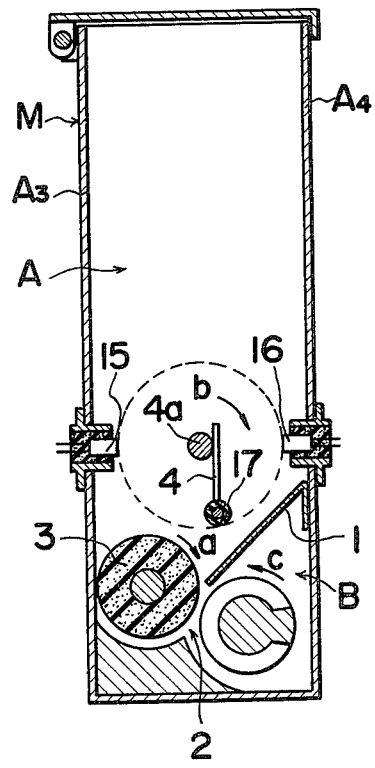

TONER DISPENSING DEVICE

BACKGROUND OF THE INVENTION

This invention relates to a toner dispensing device, and more particularly to a device for supplying toner to an apparatus for developing latent electrostatic images.

In conventional toner dispensing devices, the toner is supplied at a constant rate, for example, by rotatable spirally threaded rollers as disclosed in U.S. Pat. No. 4,089,600 to Ito et al, or by a toner supplying plate which is reciprocally movable and has supply openings therein, as disclosed in U.S. Pat. No. 4,122,981 to Takeuchi et al. Various other supplying means are also known.

In recent years, when using the above-described developing apparatus in electrophotographic copying machines which are adapted for high-speed quantity reproduction which causes an increase in toner consumption, it has become common practice to use a larger size toner storage chamber having increased capacity for the toner dispensing device to reduce the frequency with which toner must be supplied to the storage chamber. However, the increased quantity of toner in the chamber at any given time will compact the toner in the lower portion of the chamber due to the weight of the toner, with the resulting tendency that a larger amount of toner will be supplied from the lower portion of the chamber to the developing apparatus by the supplying means. On the other hand, when the quantity of the toner within the chamber is reduced, the toner in the lower portion of the chamber becomes less affected by the weight of the toner and remains at a lower density than otherwise. The amount of toner supplied is then likely to decrease.

Briefly, an increase in the capacity of the toner storage chamber entails the drawback that the toner supply varies markedly with variations in the quantity of toner accommodated in the chamber. This adversely affects the function of the developing apparatus itself. Therefore, it is imperative to overcome this drawback in the toner dispensing devices by some means. For example, the toner dispensing device disclosed in the specification of U.S. Patent 4,122,981 described above is provided with a pivotable stabilizing plate disposed within the toner tank and having a plurality of openings for passing the toner therethrough.

SUMMARY OF THE INVENTION

The main object of this invention is to provide a useful toner dispensing device having a novel construction.

Another object of the invention is to provide a toner dispensing device having a novel construction for overcoming the above-described drawbacks.

These and other objects of the present invention are achieved by a toner dispensing device comprising a toner storage chamber provided at its lower portion with an opening for passing toner therethrough, a roller disposed within the storage chamber close to the opening and rotatable for delivering the toner from the storage chamber outwardly through the opening, an intermediate toner supply chamber in communication with the storage chamber through the opening for receiving toner until it is substantially full, and means provided within the intermediate supply chamber for delivering toner therefrom at a constant rate.

Specifically, the above-described objects can be achieved by a toner dispensing device in which the roller has a rough peripheral surface.

More specifically the objects can be achieved by a toner dispensing device in which the toner supplying means is a spirally threaded roller which is driven in rotation.

Still more specifically the objects can be achieved by a toner dispensing device in which the roller has the peripheral portion diametrically opposite the peripheral portion opposed to the opening positioned close to the inside surface of the wall of the storage chamber.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 1 is a sectional elevation view of a toner dispensing device according to the invention taken along the line X—X' in FIG. 2;

FIG. 3 is a sectional elevation view similar to FIG. 1 showing a modification of the toner detector incorporated in the device.

In the following description, like parts are designated by like reference numbers throughout the several drawings.

DETAILED DESCRIPTION OF THE INVENTION

Figure 2:
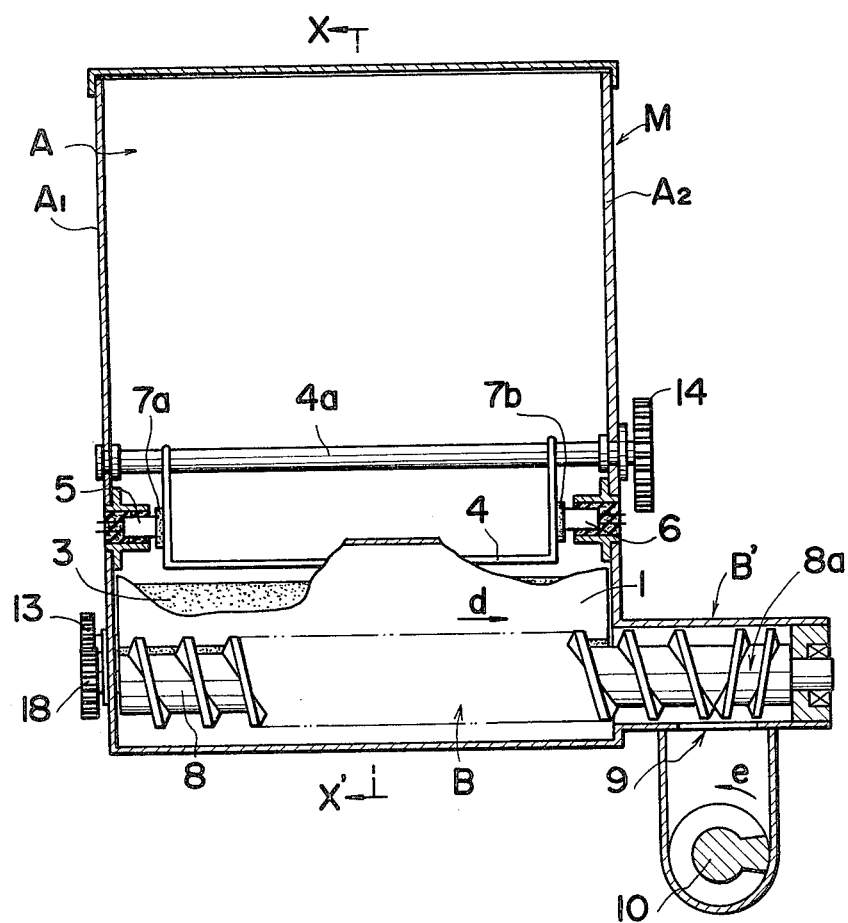
FIG. 2 is a sectional elevation view of the apparatus of FIG. 1.

The toner dispensing device illustrated in FIGS. 1 and 2 has a main body M, the interior of which is divided into a toner storage chamber A and an intermediate toner supply chamber B by a partition 1, for example made of a 0.5-mm-thick plate of phosphor bronze. The chambers A and B communicate with each other through an opening 2 for passing toner T therethrough. The opening 2 is positioned at a lower portion of the storage chamber A containing the toner T and is elongated in a direction perpendicular to the plane of FIGS. 1 and 2. A rotatable toner delivery roller 3, for example having a diameter of 24 mm, is disposed within the storage chamber A close to the opening 2 and substantially fills said opening and is rotatable, for example, at a speed of 4 r.p.m. The roller 3 is driven in the direction of arrow a, i.e. so that the upper surface moves from the outer portion toward the center of the chamber A, by an unillustrated drive source via a gear 13, whereby the toner T accommodated in the chamber A is delivered through the unfilled part of opening 2 into the supply chamber B. The roller 3 is made of, for example, open cellular foamed material (trade mark "BANPOLA", product of Bando Chemical Industries, Ltd.) and has a rough peripheral surface. The roller 3 has the periphery thereof spaced from the partition 1, for example a distance of 1 to 2 mm. As shown in FIG. 1, the roller 3 has the portion of the periphery diametrically opposite the position where the peripheral surface of the roller 3 is opposed to the opening 2, positioned close to the inner surface of the wall of the storage chamber A. When the roller 3 is made of porous material, the spacing should be not larger than 1 mm. The position where the roller 3 is mounted need not always be limited to the position described above, but can be changed as long as the roller 3 is capable of performing the foregoing function.

A toner agitator 4, rotatable about a shaft 4a and approximately U-shaped (see FIG. 2), is disposed within the storage chamber A above the roller 3. When driven in the direction of the arrow b shown by an unillustrated drive source via a gear 14, the agitator 4 agitates the toner T acommodated in the chamber A to prevent the toner T from bridging the interior of the chamber A.

An ultrasonic oscillator element 5 and a detector element 6 are mounted on opposite side walls A1 and A2 of the storage chamber A, respectively, as means for detecting the quantity of toner T stored in the chamber A. These elements 5 and 6 are attached to the side walls A1 and A2 with cushions of foamed material. The oscillator element 5 is connected to an unillustrated ultrasonic oscillator, while the detector element 6 is connected to an unillustrated detector circuit capable of detecting a variation of the ultrasonic input to the element 6 in accordance with the quantity of toner T in the chamber A. To improve the precision of the detecting means, the rotary motion of the agitator 4 is utilized for cleaning the faces of the oscillator element 5 and detector element 6 by cleaning pads 7a and 7b attached to side portions of the agitator 4 (see FIG. 2). Preferably the cleaning pads 7a and 7b are made of Moltopren (name used in trade and manufactured by Bayer A.G.) or like material. The pads can be replaced, for example, by cleaning brushes or blades. Alternatively an ultrasonic oscillator element 15 and a detector element 16 can be provided on the other side walls A3 and A4 of the chamber A as seen in FIG. 3. In this case, a cleaning pad 17 must be attached to a forward end portion of the agitator 4. FIG. 3 shows a broken line circle indicating the path of movement of the radially outer end of the agitator 4.

As will be apparent from the above description, the intermediate toner supply chamber B is in communication with the storage chamber A through the opening 2 for passing the toner T. The supply chamber B is substantially filled with the toner T and has an extension B' extending outward beyond the side wall A2 of the storage chamber A. The supply chamber B houses a rotatable spiral roller 8 which, when driven by the unillustrated drive source via a gear 18 in the direction of the arrow c, i.e. in the opposite direction to roller 3, causes the toner T to be conveyed into the extension B' and fall at a constant rate of supply through a supply opening 9 in the extension B'. For this purpose, various known means can be used in place of the spiral roller 8. The gear 13 is driven in timed relation with the gear 18 so that whenever the spiral roller 8 is driven, the roller 3 is also driven. If the roller 3 is adapted to be driven at all times, such a timed relation need not be resorted to. The spiral roller 8 is shaped so that the roller 8, when driven, will transport the toner T in the direction of an arrow d shown, except at the forward end portion 8a thereof within the projection 8a has the spiral blade shaped so as to transport the toner T in a direction opposite to the arrow d.

Disposed below the supply opening 9 is a spiral roller 10 which is rotatable in the direction of the arrow e in FIG. 2 and by which the toner T supplied by the device of this invention at a constant rate is fed to an unillustrated apparatus for developing latent electrostatic images.

The toner dispensing device according to the invention and having the construction described above operates in the following manner.

Upon the rotation of the roller 3, the toner T accommodated in the storage chamber A is delivered to the intermediate supply chamber B. When the supply chamber B becomes substantially full of toner T and if the spiral roller 8 is not rotating, the toner being fed by roller 3 is blocked by the toner T filling the supply chamber B. When the spiral roller 8 is rotating, the toner T is delivered from the chamber A to the chamber B only at a rate corresponding to the rate of flow of toner through the supply opening 9. It therefore follows that at all times the supply chamber B has accommodated therein a constant amount of toner, i.e. an amount sufficient only for substantially filling the supply chamber B. Additionally, since the roller 3 always rotates when the spiral roller 8 rotates, namely, during replenishment, the force acting through the opening 2 on the toner T within the supply chamber B during replenishment is constant at all times, with the result that the toner T within the chamber B is maintained at a constant density at least during replenishment. Furthermore, the force exerted by the rotation of the roller 3 on the toner T within the chamber B through the opening 2 is constant irrespective of the amount of the toner T accommodated in the storage chamber A.

Thus the density of toner around the spiral roller 8 is kept constant at least during the supply of toner, namely, while the spiral roller 8 is rotating, so that the toner T falls from the opening 9 and is supplied always at a constant rate without being influenced by the quantity of toner T within the storage chamber A. The supply of toner T is accurately maintained in proportion to the amount of rotation of the spiral roller 8.

Experiments conducted with the embodiments disclosed herein have shown that the rate of delivery of toner by the roller 3 to the supply chamber B when the chamber B contains no toner must be higher than the supply of toner by the spiral roller 8 through the opening 9 when the supply chamber B is full of the toner. When the device of the present embodiment is to be started up without filling up the supply chamber B with the toner T, it is desirable to drive the roller 3 alone for a period of time to fill the chamber B with the toner T.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A toner dispensing device comprising:
a toner storage chamber having in its lower portion an elongated narrow opening for passing toner therethrough; a cylindrical roller rotatably disposed within the storage chamber parallel to the length of said opening and spaced from and sufficiently close to said opening for substantially filling said opening and for delivering toner from said storage chamber outward through the unfilled part of said opening when said roller is rotated; an intermediate toner supply chamber in communication with said storage chamber through said opening and having a toner outlet and toner feeding means within said intermediate supply chamber for feeding toner out of said intermediate supply chamber through said toner outlet at a constant rate, said intermediate toner supply chamber having a space around said toner feeding means which is closed other than at said opening and said toner outlet and having a size for holding, when completely filled, a predetermined constant amount of toner; and drive means connected to said roller and said toner feeding means for always driving said roller when said toner supply means is driven and for driving said roller and said toner feeding means at speeds for causing said roller to deliver toner to said intermediate toner supply chamber when said intermediate toner supply chamber is not full at a rate greater than the rate of feed of toner by said toner feeding means when said intermediate toner supply chamber is full of toner; whereby said intermediate toner supply chamber accommodates therein a constant amount of toner sufficient only for substantially filling said intermediate toner supply chamber, and the density of the toner within said intermediate toner supply chamber is maintained constant while said toner feeding means is functioning, and when said toner feeding means stops and said intermediate toner supply chamber is filled, said cylindrical roller will not feed further toner even if it keeps rotating.

2. A toner dispensing device as claimed in claim 1 wherein the roller has a rough peripheral surface.

3. A toner dispensing device as claimed in claim 1 wherein the toner feeding means comprises a rotatably driven spirally threaded roller.

4. A toner dispensing device as claimed in claim 1 wherein said roller has the peripheral portion thereof which is diametrically opposite the peripheral portion of the roller which is opposed to the opening positioned close to the inner surface of the wall of the storage chamber.

5. A toner dispensing device as claimed in claim 1 in which said roller is driven in a direction for causing the upper surface thereof to move from the outer portion of said storage chamber toward the center thereof.

6. A toner dispenser device as claimed in claim 1 in which said feeding means is a spirally threaded roller having the axis thereof parallel to the axis of said toner delivery roller and is driven in the opposite direction of rotation to said toner delivery roller.

7. A toner dispensing device as claimed in claim 6 in which said elongated narrow opening is positioned at the center of the lower portion of the toner storage chamber, and opens in a direction perpendicular to the axis of the cylindrical roller, and said cylindrical roller has the peripheral portion thereof which is diametrically opposite the peripheral portion of the roller which is opposed to said opening positioned close to the inner surface of the wall of the toner storage chamber.

8. A toner dispensing device as claimed in claim 1 further comprising an agitator means in said storage chamber above said roller for agitating toner in said storage chamber.

9. A toner dispensing device as claimed in claim 8 in which said agitator means is a rotatable agitator member having the axis thereof parallel to the axis of said toner delivery roller and which is rotatable in the opposite direction of rotation to said toner delivery roller.

10. A toner dispensing device as claimed in claim 1 in which the distance between the peripheral surface of the cylindrical roller and the longitudinal edge of the elongated narrow opening is from 1 to 2 mm.

* * * * *